United States Patent
Wang

(10) Patent No.: US 7,193,621 B2
(45) Date of Patent: Mar. 20, 2007

(54) METHOD FOR SETTING A PIXEL CLOCK OF A DISPLAY DRIVING CIRCUIT

(75) Inventor: Chih-Hao Wang, Taipei Hsien (TW)

(73) Assignee: VIA Technologies Inc., Hsin-Tien (TW)

( * ) Notice: Subject to any disclaimer, the term of this patent is extended or adjusted under 35 U.S.C. 154(b) by 500 days.

(21) Appl. No.: 10/708,046

(22) Filed: Feb. 4, 2004

(65) Prior Publication Data
US 2004/0174352 A1 Sep. 9, 2004

(30) Foreign Application Priority Data
Mar. 7, 2003 (TW) .............................. 92105013 A

(51) Int. Cl.
*G09G 5/00* (2006.01)
(52) U.S. Cl. ...................... 345/204; 345/212; 345/213; 348/537
(58) Field of Classification Search ................ 345/204, 345/212, 213; 348/537
See application file for complete search history.

(56) References Cited

U.S. PATENT DOCUMENTS

| | | | | |
|---|---|---|---|---|
| 6,078,317 A | * | 6/2000 | Sawada | 345/204 |
| 6,633,288 B2 | * | 10/2003 | Agarwal et al. | 345/213 |
| 2003/0011588 A1 | * | 1/2003 | Kim | 345/213 |

* cited by examiner

*Primary Examiner*—Jimmy H. Nguyen
(74) *Attorney, Agent, or Firm*—Winston Hsu

(57) ABSTRACT

A method for setting a pixel clock of a display driving circuit. The display driving circuit has a basic input/output system (BIOS) for controlling a clock generator to output the pixel clock. The method includes reading a predetermined pixel clock according to a display mode setting, utilizing a plurality of scaling factors to respectively adjust a reference clock for generating a plurality of calculation results, utilizing a plurality of coefficients R to respectively right-shift R bits of the calculation results for generating a plurality of quotients, comparing a plurality of differences between the quotients and the predetermined pixel clock for obtaining an optimum quotient, and controlling the clock generator to output an actual pixel clock according to the scaling factor and the coefficient R related to the optimum quotient.

4 Claims, 3 Drawing Sheets

METHOD FOR SETTING A PIXEL CLOCK OF A DISPLAY DRIVING CIRCUIT

BACKGROUND OF INVENTION

1. Field of the Invention

The present invention relates to a method for setting a pixel clock. In particular, the present invention discloses a method for setting a pixel clock used by a display controller.

2. Description of the Prior Art

With popularization of computer devices, associated computer technology has been quickly developed to improve functionality and convenience of computer devices. Recently, operating speed of a central processing unit (CPU) has already exceeded one gigahertz (GHz), and the computer devices have powerful data processing capability now. Therefore, normal users do not merely view the computer devices as great helpers for work. The computer device increasingly becomes one of the entertainment facilities at home. In addition, with development and application of well-known multimedia technology, monitors and graphics cards of computer devices responsible for outputting videos become a major factor when consumers purchase computer devices. Generally speaking, in order to conform to a plug and play (PNP) specification, the monitor has a display data channel (DDC) used to establish communication between a host of the computer device and the monitor of the computer device. That is, the monitor is capable of directly transferring its own hardware specification to the graphics card within the host. Therefore, the graphics card then acknowledges the hardware specification of the monitor. For example, the hardware specification includes maximum horizontal scanning frequency, the maximum vertical refresh rate, etc.

In the past, graphics cards of different brands had different settings for display modes of the monitor. Therefore, a compatibility problem existed among the graphics cards. For instance, an application established an interface between the application and hardware of the graphics card through instructions defined in a basic input/output system (BIOS) of the graphics card. However, with regard to different graphics cards, instructions defined in the basic input/output systems of these different graphics cards are not compatible. Therefore, the application was not capable of being applied to different graphics cards successfully. Finally, a video electronic standards association (VESA) defines a VESA bios extension (VBE) used to unify instructions within BIOS of the graphics card. In addition, the BIOS further records different display mode settings supported by the graphics card. Each display mode setting includes display information such as a horizontal scanning frequency, a vertical refresh rate, resolution, and gray levels for pixels.

Please refer to FIG. 1, which is a block diagram of a prior art computer device 10. The computer device 10 includes a central processing unit (CPU) 12, a memory 14, a chipset 15, a display driving circuit 16, and a display device 18 such as a monitor. The computer device 10 loads an operating system 20 into the memory 14 through a power-on-self-test (POST) procedure. Then, the chipset 15 is further actuated to coordinate data access for controlling operation of the computer device 10. The display driving circuit 16 is used to drive a plurality of pixels 22 positioned at the display device 18 so as to show a corresponding image. When a user adjusts a display mode setting related to the display device 18 through the operating system 20. The display driving circuit 16 used to drive the display device 18 resets a pixel clock according to the above-mentioned VBE specification. The pixel clock is used to control timing of setting gray level of each pixel. For example, suppose the user sets the resolution of display device 18 to be 1024×768. It is well-known that the display device 18 actually scans its screen (1360×802 for example) greater than the desired display area 1024×768 set by the user. If the user sets the vertical refresh rate associated with the display mode (1024×768) to be 60 Hz through the operating system 20. The frequency of desired pixel clock is equal to 1360*802*60 Hz, that is, 65443200 Hz.

The principal of the above operation is briefly described as follows. One frame shown on the display device 18 contains 1360*802 pixels needed to be scanned, and the vertical refresh rate is 60 Hz which means that 60 frames are scanned every one second. Therefore, gray levels of 655443200 pixels are set in one second. However, with regard to the display driving circuit 16, a hardware circuit such as a clock generator 24 is utilized to set the wanted pixel clock. Because the clock generator 24 is not capable of precisely generating the pixel clock with the required frequency (65443200 Hz), a basic input/output system 26 of the display driving circuit 16 needs to perform a clock setting procedure 28 for controlling the clock generator 24 to output a clock signal with a frequency approaching 65443200 Hz. Then, the outputted clock signal is adopted to be an actual pixel clock of the display driving circuit 16. The clock generator 24 generates the actual pixel clock according to a reference clock outputted from an oscillator 30.

As mentioned above, the clock generator 24 of the display driving circuit 16 cannot produce a predetermined pixel clock calculated according to a display mode. It is well-known the display driving circuit 16 has to generate the actual pixel clock approaching the predetermined pixel clock according to hardware specification of the clock generator 24. Generally speaking, the commonly used clock generator includes circuit components such as a frequency divider, a phase lock loop, etc., for generating the actual pixel clock based on the reference clock outputted from the oscillator 30. The oscillator 30 can be a crystal oscillator used to generate the reference clock with frequency equaling 14.318 megahertz (MHz), and inputs the reference clock into the clock generator 24. In other words, the actual pixel clock CLKcal is equal to a product calculated from the reference clock CLKref multiplied by result of a predetermined formula $(M+2)/[(N+2)*2^R]$.

The prior art process of setting the pixel clock, that is, execution of the clock setting procedure 28 is illustrated in the flow chart shown in FIG. 2. First, an initial value MINn is assigned to a value N (step 102). Then, the value N is checked to determine whether the value N is less than a threshold value MAXn (step 104). Step 104 is mainly used to determine if loop operations corresponding to the value N are finished. If the value N is greater than the threshold value MAXn, the loop operation associated with the value N is terminated, and then the clock generator 24 starts setting the pixel clock (step 136). On the contrary, if the value N is less than the threshold value MAXn, an initial value MINm is assigned to a value M (step 106). Then, the value M is checked to determine whether the value M is less than a threshold value MAXm (step 108). Similarly, step 108 is used to check if loop operations associated with the value M are finished. If the value M is greater than the threshold value MAXm, the loop operations corresponding to the value M are terminated, and the value N is then increased by 1 (step 110). On the contrary, if the value M is less than the threshold value MAXm, the reference clock CLKref is multiplied by a scaling factor to produce a product Vco (step 112). The scaling factor is represented by (M+2)/(N+2).

Referring to the predetermined formula $(M+2)/[(N+2)*2^R]$, it is obvious that the calculated product Vco should be divided by $2^R$. Therefore, after step 112 has been completed, an initial value MINr is assigned to a value R (step 114), and the value R is checked to determine if the value R is less than a threshold value MAXr (step 116). Step 116 is used to check whether loop operations associated with the value R are finished. If the value R is greater than the threshold value MAXr, the loop operations corresponding to the value R are terminated, and the value M is increased by 1 (step 118). On the contrary, if the value R is less than the threshold value MAXr, a calculation result CLKcal is calculated from dividing the product Vco by a divisor $2^R$ (step 120).

The calculation result is one candidate of the actual pixel clock. Therefore, a following comparing procedure is activated to judge the calculation result. It is first checked to see if values M, N, R are respectively equal to initial values MINm, MINn, MINr. If the values M, N, R respectively equal initial values MINm, MINn, MINr, the calculation result CLKcal calculated from step 120 is a first result outputted by the prior art clock setting procedure. Therefore, the calculation result CLKcal is an initial value of an optimum calculation result CLKbest (step 130). On the contrary, if values M, N, R are not respectively equal to initial values MINm, MINn, MINr, the calculation result CLKcal and a predetermined pixel clock CLKp are used to calculate a first difference D1 (step 124), and a second difference D2 is calculated according to the optimum calculation result CLKbest and the predetermined pixel clock CLKp (step 126). Finally, a check is done to determine if the first difference D1 is less than the second difference D2 (step 128). If the first difference D1 is less than the second difference D2, it means that the calculation result CLKcal is less than the currently recorded optimum calculation result CLKbest. Then, value of the calculation result CLKcal updates the optimum calculation result CLKbest (step 130). At the same time, values M, N, R corresponding to the optimum calculation result CLKbest are recorded, and then the value R is increased by 1. The clock setting procedure then jumps to step 106 for continuously performing following loop operations associated with the value R. On the contrary, if the first difference D1 is greater than the second difference D2, it means that the currently recorded optimum calculation result CLKbest is less than the calculation result CLKcal, and the optimum calculation result CLKbest holds its value without being updated. Similarly, the value R is increased by 1, and the prior art clock setting procedure jumps to step 116 for performing following loop operations associated with the value R.

The prior art clock setting procedure contains loop operations respectively corresponding values M, N, R. After the three loop operations are completed, it means that the prior art clock setting procedure totally calculates 128*128*128 calculation results CLKcal. However, from above-mentioned steps 124, 126, 128, 130, 132, it is obvious that only the optimum calculation result CLKbest and corresponding values M, N, R are finally recorded, wherein the values M, N, R are inputted into the clock generator 24 for control the actual pixel clock to equal the optimum calculation result CLKbest (step 136).

Because BIOS of the graphics card has a limited memory capacity equaling 64 k bytes, program codes of the BIOS are loaded into memory addresses ranging from C0000H to D0000H of the memory 14 when the computer device 10 is booting up. Concerning step 120, the program codes must include a power calculation for obtaining the necessary divisor $2^R$. Then, a division related to a dividend (the product Vco) and the divisor $2^R$ is performed to figure out a quotient and a remainder. However, during the process of setting the pixel clock, the calculated remainder is actually discarded. That is, only the calculated quotient is reserved to set the calculation result CLKcal. As mentioned above, operation of the prior art corresponds to great computational complexity. Therefore, program code associated with the clock setting procedure demands a great amount of instructions so that the memory capacity of the BIOS 26 is seriously occupied. In other words, the BIOS 26 with a limited memory capacity is not capable of including additional program codes to expand functionality of the display driving circuit 16. In addition, CPU 12 of the computer device 10 requires a stack with a great capacity so that the CPU 12 can successfully push data onto the stack and pop data out of the stack when performing above-mentioned clock setting procedure.

It is well-known that certain segments of the memory 14 are reserved for special purposes. If the data pushed onto the stack occupies the reserved segments of the memory 14, the stored data absolutely overwrites data previously held in the reserved segments. Therefore, an unexpected crash may occur on the computer device 10. Otherwise, when the data pushed onto the stack occupies the reserved segments of the memory 14, and the CPU 12 stores data later to update information held in the reserved segments, it is obvious that the data previously pushed onto the stack are modified finally. Therefore, during the process of calculating the calculation result CLKcal, when the information held in the reserved segments is extracted from the stack, the erroneous data then affect the desired calculation result CLKcal. In addition, steps 124, 126 are respectively used to calculate the first difference D1 and the second difference D2. Then, the step 128 is executed to compare the first and second differences D1, D2. At the same time, step 130 utilizes the calculation result CLKcal to determine the optimum calculation result CLKbest so that step 126 is capable of calculating the second difference D2. Therefore, if the calculation result CLKcal is represented by 32 bits, not only is the above calculation complicated, but also the stack makes use of a great amount of capacities.

SUMMARY OF INVENTION

It is therefore a primary objective of this invention to provide a method of setting pixel clock of a display driving circuit, which corresponds to minor computational complexity.

Briefly summarized, one of the preferred embodiments of the claimed invention discloses a method for setting a pixel clock of a display driving circuit. The display driving circuit is used to drive a display device. The method includes deriving a predetermined pixel clock from a display mode setting set by the display device, generating a reference clock, and using a plurality of scaling factors for respectively adjusting a frequency value of the reference clock to generate a plurality of calculation results, wherein the scaling factors are generated by using a plurality of first coefficients M and a plurality of second coefficients N, the first coefficients M are used to increase the frequency value, the second coefficients N are used to decrease the frequency value, and the first coefficients M and the second coefficients N are natural numbers, using a plurality of third coefficients R for respectively right-shifting R bits of the calculation results to generate a plurality of quotients, the third coefficients R being natural numbers, wherein the first coefficients M, the second coefficients N, and the third coefficients R form a plurality of combinations, and the combinations are calculated within a plurality of loop operations to generate the quotients, using a first difference between a quotient and the predetermined pixel clock which is calculated in a first loop operation as a minimum difference, if a second difference between a quotient and the predetermined pixel which is calculated in a second loop operation after the first loop operation is less than the first difference, using the second difference to update the minimum difference, recording values of the first coefficients M, the second coefficients N, the third coefficients R, and the minimum difference for each loop operation, after all of the loop operations are executed, using a quotient associated with the minimum difference as the optimum quotient, and using a scaling factor and a first coefficient R corresponding to the optimum quotient for generating an actual pixel clock used to drive the display device.

Another preferred embodiment of the claimed invention discloses a method for setting a pixel clock of a display driving circuit. The display driving circuit is used to drive a display device. The method includes deriving a predetermined pixel clock from a display mode setting set by the display device, generating a reference clock, and using a plurality of first coefficients R for respectively right-shifting R bits of a frequency value of the reference clock to generate a plurality of quotients the first coefficients R being natural numbers, using a plurality of scaling factors for respectively adjusting the quotients to generate a plurality of calculation results, wherein the scaling factors are generated by using a plurality of second coefficients M and a plurality of third coefficients N, the second coefficients M are used to increase the frequency value, the third coefficients N are used to decrease the frequency value, and the second coefficients M and the third coefficients N are natural numbers, wherein the first coefficients R, the second coefficients M, and the third coefficients N form a plurality of combinations, and the combinations are calculated within a plurality of loop operations to generate the quotients, using a first difference between a quotient and the predetermined pixel clock which is calculated in a first loop operation as a minimum difference, if a second difference between a quotient and the predetermined pixel which is calculated in a second loop operation after the first loop operation is less than the first difference, using the second difference to update the minimum difference, recording values of the first coefficients R, the second coefficients M, the third coefficients N, and the minimum difference for each loop operation, after all of the loop operations are executed to calculate the differences, using a quotient associated with the minimum difference as the optimum quotient, and using a scaling factor and a first coefficient R corresponding to the optimum calculation result for generating an actual pixel clock used to drive the display device.

It is an advantage of the claimed invention that the claimed method corresponds to minor computational complexity so that amount of instructions in an associated program code is greatly reduced. In other words, a basic input/output system of a display driving circuit is capable of accommodating other program codes used to expand functionality of the display driving circuit. In addition, amount of the stack capacity is also reduced owing to the minor computational complexity, and the reserved segments in the memory are protected from being occupied by the expanding stack capacity. Moreover, the unexpected crash problem is simultaneously solved according to the claimed method.

These and other objectives of the present invention will no doubt become obvious to those of ordinary skill in the art after reading the following detailed description of the preferred embodiment, which is illustrated in the various figures and drawings.

DETAILED DESCRIPTION

Figure 1:
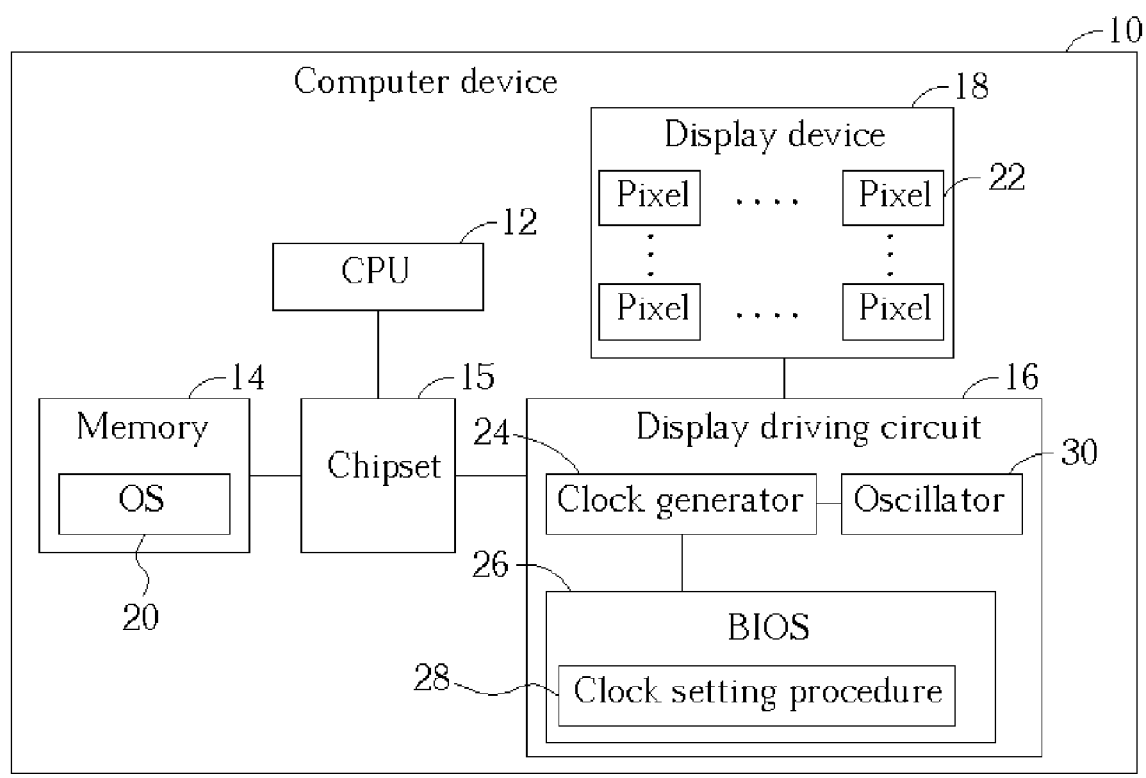
FIG. 1 is a block diagram of a prior art computer device.
Figure 2:
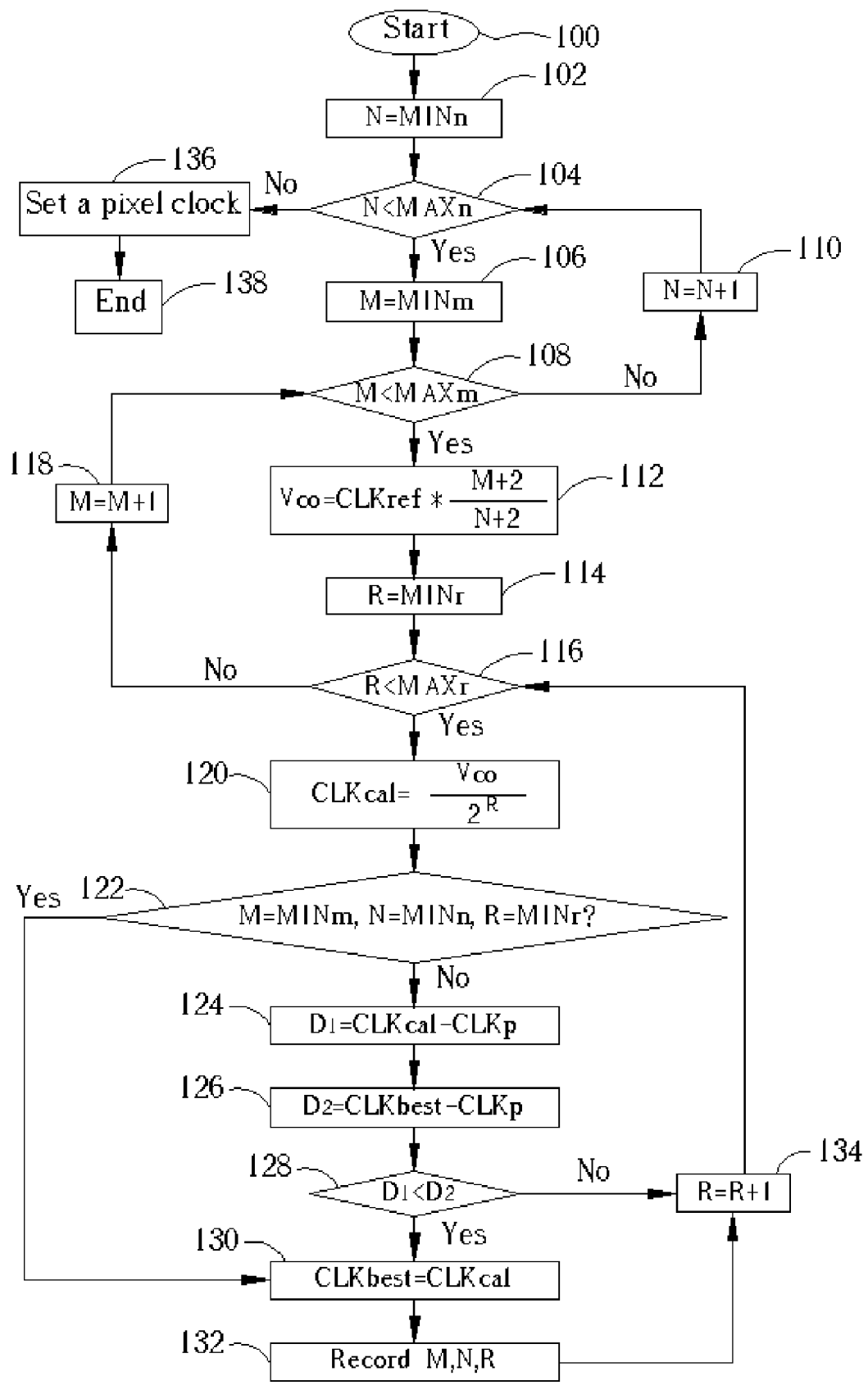
FIG. 2 is a flow chart illustrating a prior art process of setting the pixel clock.
Figure 3:
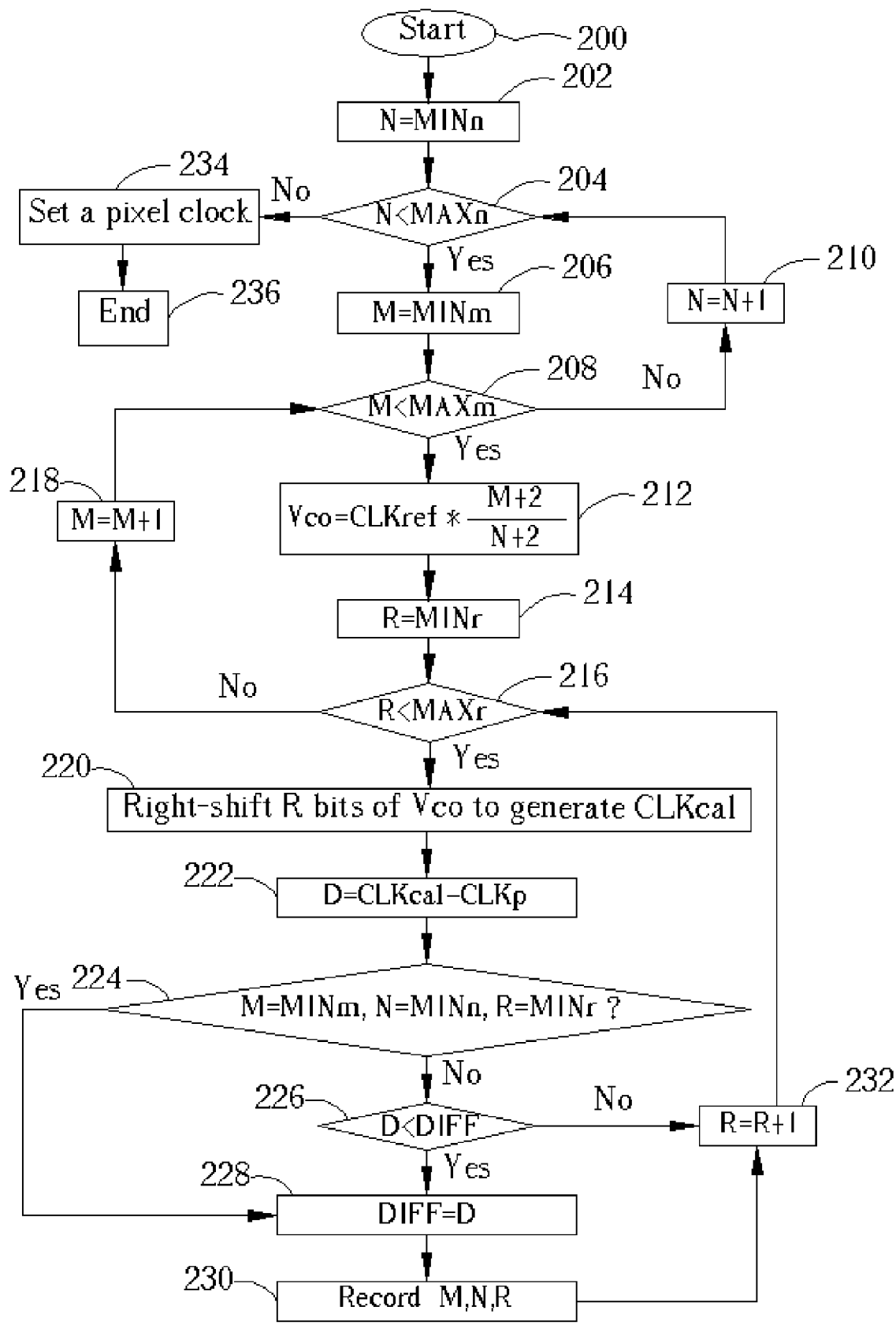
FIG. 3 is a flow chart illustrating a claimed method of setting the pixel clock.

Please refer to FIG. 3 in conjunction with FIG. 1. FIG. 3 is a flow chart illustrating a method of setting the pixel clock. The method of setting the pixel clock is applied to the computer device 10 shown in FIG. 1, wherein the clock generator 24 is positioned inside a video chip. The display driving circuit 16 having the video chip is a graphics card or is positioned at a motherboard. In addition, functionality of components within the computer device 10 has been described previously. Therefore, the lengthy description is skipped for simplicity. The method of setting the pixel clock comprises following steps.

Step 200: Begin;
Step 202: Assign an initial value MINn to a value N;
Step 204: Determine whether the value N is less than a threshold value MAXn. If so, go to step 206; otherwise, jump to step 234;
Step 206: Assign an initial value MINm to a value M;
Step 208: Determine whether the value M is less than a threshold value MAXm. If so, go to step 212; otherwise, go to step 210;
Step 210: The value N is increased by 1. Go back to step 204;
Step 212: Calculate a product Vco generated from a reference clock CLKref multiplied by a scaling factor. The scaling factor is composed of values M, N, and is equivalent to $(M+2)/(N+2)$;
Step 214: Assign an initial value MINr to a value R;
Step 216: Determine whether the value R is less than a threshold value MAXr. If so, jump to step 220; otherwise, go to step 218;
Step 218: The value M is increased by 1. Go back to step 208;
Step 220: Calculate a calculation result CLKcal that is calculated by right-shifting R bits of the product Vco;
Step 222: Calculate a difference D according to the calculation result CLKcal and a predetermined pixel clock CLKp;
Step 224: Check whether values M, N, R are respectively equal to initial values MINm, MINn, MINr. If so, jump to step 228; otherwise, go to step 226;
Step 226: Determine whether the difference D is less than a minimum difference DIFF. If so, go to step 228; otherwise, jump to step 232;
Step 228: Assign the difference D as the minimum difference DIFF;
Step 230: Record values M, N, R corresponding to the minimum difference DIFF;
Step 232: The value R is increased by 1. Go back to step 216.
Step 234: Utilize values M, N, R corresponding to the minimum difference DIFF to set the actual pixel clock;
Step 236: End.

It is well-known that the clock generator 24 of the display driving circuit 16 is not capable of precisely outputting a predetermined pixel clock calculated according to a display mode setting. Therefore, the display driving circuit 16 has to generate an actual pixel clock approaching the predetermined pixel clock according hardware specification of the clock generator 24. Generally speaking, the widely used clock generator 24 includes components such as a frequency divider, a phase-lock loop, etc., for generating the actual pixel clock based on a reference clock outputted from the oscillator 30. In addition, the clock generator 24 is capable of utilizing a system clock, a bus clock, or other clock signals inputted into the display driving circuit 16 to be the reference clock.

Operation of the clock generator 24 is viewed as converting the reference clock into the actual pixel clock according to a predetermined formula. For instance, the actual pixel clock is equal to the reference clock multiplied by the predetermined formula $(M+2)/[(N+2)*2]$. Operation associated with the claimed method of setting the pixel clock, that is, the execution of the clock setting procedure 28 is described as follows. When the BIOS 26 derives display mode setting of the display device 18, the BIOS 26 first determines the predetermined pixel clock CLKp corresponding to the display mode setting. Then, as shown in FIG. 3, an initial value MINn is assigned to a value N in the beginning (step 202), and then the value N is checked to judge whether the value N is less than a threshold value MAXn (step 204). Step 204 is mainly used to determine whether loop operations associated with the value N are completed. If the value N is greater than the threshold value MAXn, the loop operations corresponding to the value N are terminated, and the clock generator 24 starts setting the pixel clock (step 234). On the contrary, if the value N is less than the threshold value MAXn, an initial value MINm is assigned to a value M (step 206). Then, the value M is judged to see if the value M is less than a threshold value MAXm (step 208). Similarly, step 208 is used to decide whether loop operations associated with the value M are finished. If the value M is greater than the threshold value MAXm, the loop operations corresponding to the value M are terminated, and the value N is increased by 1 (step 210). On the contrary, if the value M is less than the threshold value MAXm, a product Vco is calculated from the reference clock CLKref multiplied by a scaling factor (step 212). The scaling factor is represented by $(M+2)/(N+2)$.

Referring to the predetermined formula $(M+2)/[(N+2)*2^R]$, the product Vco still should be divided by $2^R$. Therefore, after step 212 is completed, an initial value MINr is assigned to a value R (step 214), and the value R is checked to see if the value R is less than a threshold value MAXr (step 216). Step 216 is used to judge whether loop operations associated with the value R are finished. If the value R is greater than the threshold value MAXr, loop operations corresponding to the value R are terminated, and the value M is increased by 1 (step 218). On the contrary, if the value R is less than the threshold value MAXr, a calculation result CLKcal is generated from right-shifting R bits of the product Vco (step 220). Please note that the calculation in the preferred embodiment for dividing the product Vco by $2^R$ is implemented by a bit shifting operation.

The calculation result CLKcal is one candidate of the actual pixel clock. Therefore, a following comparing procedure is activated to judge the calculation result CLKcal. First, a difference D is derived from the calculation result CLKcal and a predetermined pixel clock CLKp (step 222). Then, it is checked to see if values M, N, R are respectively equal to initial values MINm, MINn, MINr (step 224). If the values M, N, R respectively equal initial values MINm, MINn, MINr, it means that the difference D calculated from step 220 is a first difference result outputted by the claimed clock setting procedure. Therefore, the difference D is an initial value of a minimum difference DIFF (step 228). On the contrary, if values M, N, R are not respectively equal to initial values MINm, MINn, MINr, the difference D then updates the minimum difference DIFF (step 228). At the same time, values M, N, R corresponding to the minimum difference DIFF are recorded (step 230). Then, the value R is increased by 1 (step 232), and the flow goes back to step 216 to continue following loop operations associated with the value R. On the contrary, if the difference D is greater than the minimum difference DIFF, it means that the currently recorded minimum difference DIFF needs to hold its value without being updated. The value R is then increased by 1 (step 232), and the flow goes back to step 216 to continue loop operations corresponding the value R.

The claimed clock setting procedure mentioned above includes loop operations respectively corresponding to the values M, N, R. After all of the loop operations are completed, values M, N, R corresponding to the minimum difference DIFF can be utilized to obtain a clock signal mostly approaching the predetermined pixel clock through the predetermined formula $(M+2)/[(N+2)*2^R]$. For example, if each of the values M, N, R ranges from 1 to 128, it is clear that loop operations associated with the value M are executed totally about 128 times when each loop operation associated with the value N is started. Similarly, it is apparent that loop operations associated with the value R are executed totally about 128 times when each loop operation associated with the value M is started. In other words, the amount of the difference D totally figured out through the above flow is equal to 128*128*128 after all of the loop operations are completed. However, through steps 226, 228, 230, 232, only the minimum difference DIFF and corresponding values M, N, R are recorded in the preferred embodiment, and the values M, N, R are passed to the clock generator 24 for controlling generation of the actual pixel clock (step 234).

It is noteworthy that loop operations corresponding to the value M (step 208) are scheduled within each loop operation associated with the value N (step 204), and loop operations corresponding to the value R (step 216) are scheduled within each loop operation associated with the value M (step 208). However, the processing order related to loop operations of the values M, N, R could be adjusted to achieve the same objective of the claimed method. For instance, loop operations corresponding to the value N are scheduled within each loop operation associated with the value M, and loop operations corresponding to the value R are scheduled within each loop operation associated with the value N. Furthermore, other sequence arrangements for the loop operations corresponding to the values M, N, R can be easily figured out. In other words, the reference clock CLKref can be first scaled by the value M or the value N to produce the calculation result, and then the value R is introduced for performing a bit shifting process on the calculation result for obtaining a quotient. In the end, a comparing procedure is further activated. On the other hand, the value R is first introduced for performing a bit shift process on the reference clock CLKref to produce a quotient, and then the quotient is scaled by the value M or the value N to produce the calculation result. In the end, a comparing procedure is further activated.

Because the remainder of the $Vco/2^R$ has nothing to do with the calculation result CLKcal, the product Vco divided by $2^R$ is quickly calculated by the well-known bit shifting operation without concerning the remainder of the $Vco/2^R$. Therefore, the computational complexity is reduced, and the amount of instructions in the program code associated with the clock setting procedure is greatly lessened. Owing to the reduced computational complexity, the required capacity of the stack allocated in the memory is also decreased to diminish the possibility of occupying the reserved segments. That is, probability of the crash occurring in the computer device 10 is further decreased as well. In addition, step 226 in the preferred embodiment compares the difference D with the minimum difference DIFF, and step 228 only records the minimum difference DIFF. It is clear that bit length corresponding to the difference D and the minimum difference DIFF is shorter than that of the calculation result CLKcal. In the preferred embodiment, the computational complexity of the above comparing operation, therefore, is minor, and amount of instructions in the program is less. In addition, amount of the stack capacity used during the calculation process is reduced.

In contrast to the prior art, the claimed method of setting the pixel clock uses a bit shifting operation to perform a division calculation so as to quickly obtain a quotient. Then, the quotient and a predetermined pixel clock are used to figure out a difference D. In the end, the difference D and a minimum difference DIFF are compared to determine whether the minimum difference DIFF should be updated or not. In addition, values M, N, R corresponding to the minimum difference DIFF are recorded at the same time. After loop operations corresponding to values M, N, R, the values M, N, R corresponding to the finally obtained minimum difference DIFF are utilized to drive a clock generator to generate an actual pixel clock used to drive pixels of a display device. Therefore, the claimed method corresponds to minor computational complexity so that amount of instructions in an associated program code is greatly reduced. In other words, a basic input/output system of a display driving circuit is capable of accommodating other program codes used to expand functionality of the display driving circuit. In addition, amount of the stack capacity is also reduced owing to the minor computational complexity, and the reserved segments in the memory are protected from being occupied by the expanding stack capacity. Moreover, the unexpected crash problem is simultaneously solved according to the claimed method.

Those skilled in the art will readily observe that numerous modifications and alterations of the device may be made while retaining the teachings of the invention. Accordingly, the above disclosure should be construed as limited only by the metes and bounds of the appended claims.

The invention claimed is:

1. A method for setting a pixel clock of a display driving circuit, the display driving circuit being used to drive a display device, the method comprising:

deriving a predetermined pixel clock from a display mode setting set by the display device;

generating a reference clock, and using a plurality of scaling factors for respectively adjusting a frequency value of the reference clock to generate a plurality of calculation results, wherein the scaling factors are generated by using a plurality of first coefficients M and a plurality of second coefficients N, the first coefficients M are used to increase the frequency value, the second coefficients N are used to decrease the frequency value, and the first coefficients M and the second coefficients N are natural numbers;

using a plurality of third coefficients R for respectively right-shifting R bits of the calculation results to generate a plurality of quotients, the third coefficients R being natural numbers, wherein the first coefficients M, the second coefficients N, and the third coefficients R form a plurality of combinations, and the combinations are calculated within a plurality of loop operations to generate the quotients;

using a first difference between a quotient and the predetermined pixel clock which is calculated in a first loop operation as a minimum difference;

if a second difference between a quotient and the predetermined pixel which is calculated in a second loop operation after the first loop operation is less than the first difference, using the second difference to update the minimum difference;

recording values of the first coefficients M, the second coefficients N, the third coefficients R, and the minimum difference for each loop operation;

after all of the loop operations are executed, using a quotient associated with the minimum difference as the optimum quotient; and controlling a clock generator to output an actual pixel clock signal by using a scaling factor and a third coefficient R corresponding to the optimum quotient, said actual pixel clock signal used to drive the display device.

2. The method of claim 1 wherein the scaling factors correspond to (M+2)/(N+2).

3. A method for setting a pixel clock of a display driving circuit, the display driving circuit being used to drive a display device, the method comprising:

deriving a predetermined pixel clock from a display mode setting set by the display device;

generating a reference clock, and using a plurality of first coefficients R for respectively right-shifting R bits of a frequency value of the reference clock to generate a plurality of quotients, the first coefficients R being natural numbers;

using a plurality of scaling factors for respectively adjusting the quotients to generate a plurality of calculation results, wherein the scaling factors are generated by using a plurality of second coefficients M and a plurality of third coefficients N, the second coefficients M are used to increase the frequency value, the third coefficients N are used to decrease the frequency value, and the second coefficients M and the third coefficients N are natural numbers, wherein the first coefficients R, the second coefficients M, and the third coefficients N form a plurality of combinations, and the combinations are calculated within a plurality of loop operations to generate the quotients;

using a first difference between a quotient and the predetermined pixel clock which is calculated in a first loop operation as a minimum difference;

if a second difference between a quotient and the predetermined pixel which is calculated in a second loop operation after the first loop operation is less than the first difference, using the second difference to update the minimum difference;

recording values of the first coefficients R, the second coefficients M, the third coefficients N, and the minimum difference for each loop operation;

after all of the loop operations are executed to calculate the differences, using a quotient associated with the minimum difference as the optimum quotient; and controlling a clock generator to output an actual pixel clock signal by using a scaling factor and a third coefficient R corresponding to the optimum quotient, said actual pixel clock signal used to drive the display device.

4. The method of claim 3 wherein the scaling factors correspond to (M+2)/(N+2).

* * * * *